United States Patent
Kanamori

[11] Patent Number: 6,078,401
[45] Date of Patent: Jun. 20, 2000

[54] IMAGE FORMING APPARATUS

[75] Inventor: Keiko Kanamori, Kawasaki, Japan

[73] Assignee: Kabushiki Kaisha Toshiba, Kawasaki, Japan

[21] Appl. No.: 08/880,461

[22] Filed: Jun. 24, 1997

[30] Foreign Application Priority Data

Jun. 28, 1996 [JP] Japan ................................ 8-170446

[51] Int. Cl.[7] .............................. B41B 15/00; H04N 1/40
[52] U.S. Cl. ...................... 358/1.16; 358/1.16; 358/1.15; 358/456; 358/458; 358/500; 358/459
[58] Field of Search ................................... 358/456, 458, 358/500, 459, 1.16, 1.15; 395/115, 114

[56] References Cited

U.S. PATENT DOCUMENTS

| | | | |
|---|---|---|---|
| 4,805,013 | 2/1989 | Dei et al. | 358/80 |
| 5,060,061 | 10/1991 | Shishido et al. | 358/80 |
| 5,113,251 | 5/1992 | Ichiyanagi et al. | 358/75 |
| 5,187,570 | 2/1993 | Hibi et al. | 358/80 |
| 5,260,806 | 11/1993 | Samworth | 358/456 |

FOREIGN PATENT DOCUMENTS

| | | |
|---|---|---|
| 0 110 185 | 6/1984 | European Pat. Off. . |
| 0 424 920 | 5/1991 | European Pat. Off. . |
| 0 514 166 | 11/1992 | European Pat. Off. . |
| 0424920A2 | 10/1999 | European Pat. Off. ......... H04N 1/40 |

*Primary Examiner*—Edward L. Coles
*Assistant Examiner*—Twyler Lamb
*Attorney, Agent, or Firm*—Foley & Lardner

[57] ABSTRACT

In order to reduce the storage capacity of a memory for a density adjusting table and change the density adjustment range with a relatively high degree of freedom, a density characteristic adjusting table section corresponding to set density based on reference data of light, center and dark for density characteristic adjustment previously stored in a correction data table section is created in a table forming section, a density characteristic adjustment value corresponding to an input image signal from a scanner section is derived by effecting the linear interpolation according to neighboring density characteristic adjustment values based on the input image signal in a density characteristic adjustment value calculating section, and the input image signal is corrected by use of the derived density characteristic adjustment value in a density characteristic adjusting section and then output to a printer section as an output image signal.

8 Claims, 9 Drawing Sheets

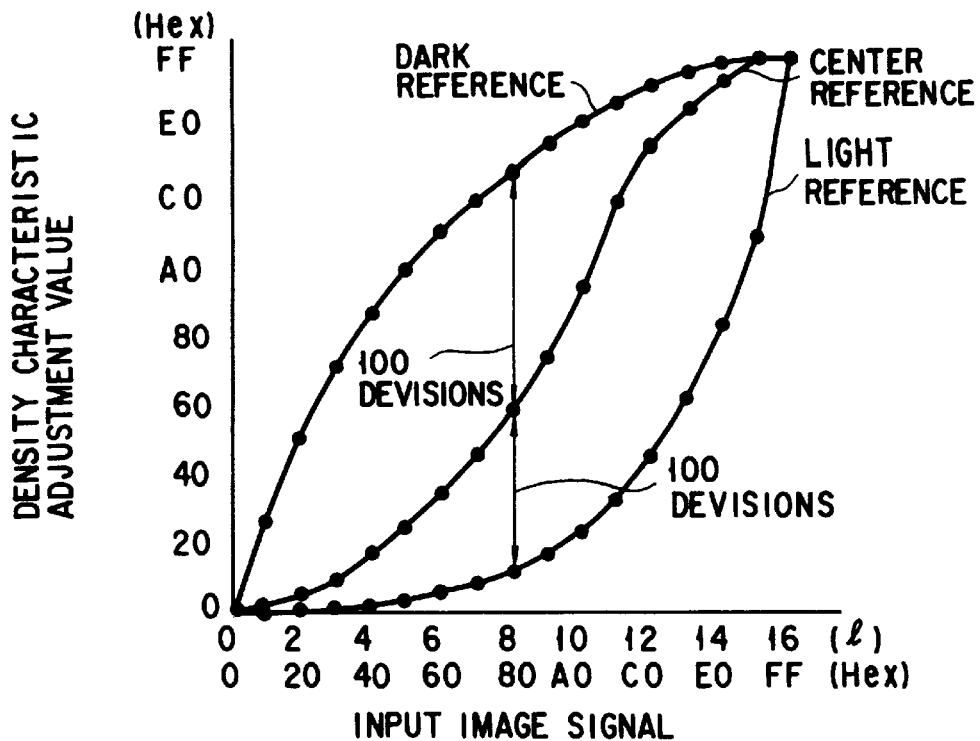
F I G. 5
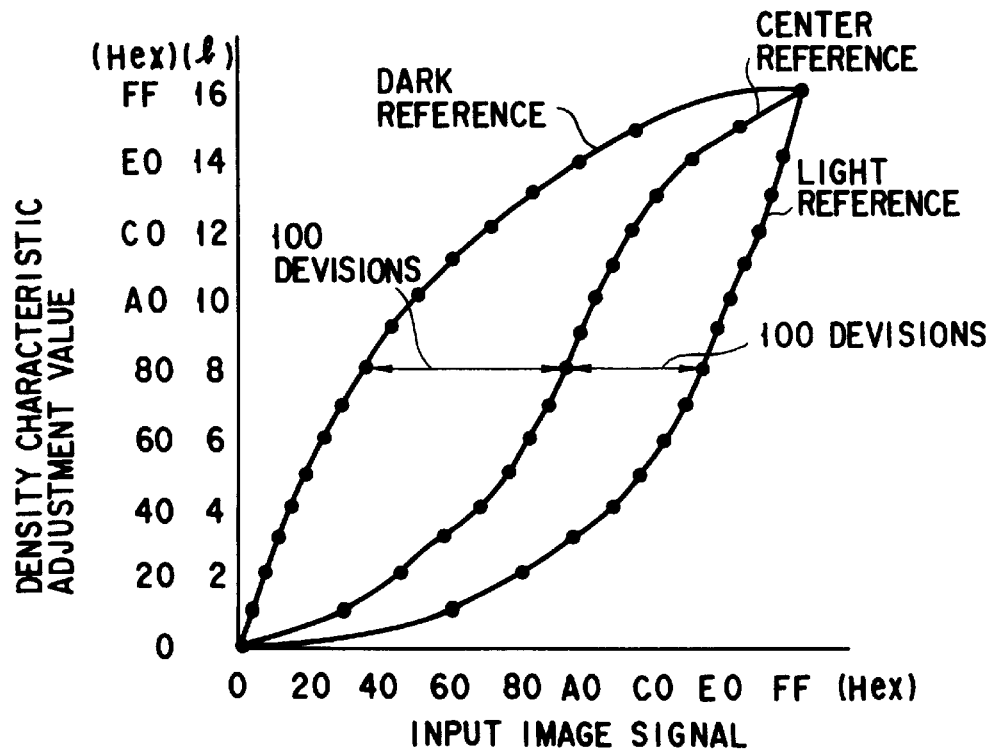
F I G. 6

| INPUT IMAGE SIGNAL VALUE (h) | DENSITY CHARACTERISTIC ADJUSTMENT VALUE (h) |
| --- | --- |
| 00 | 00 |
| 10 | 09 |
| 20 | 12 |
| 30 | 1D |
| 40 | 2D |
| 50 | 3C |
| 60 | 4B |
| 70 | 5F |
| 80 | 76 |
| A0 | 9A |
| B0 | B9 |
| C0 | D0 |
| D0 | E2 |
| E0 | F2 |
| F0 | FC |
| FF | FF |

FIG. 7

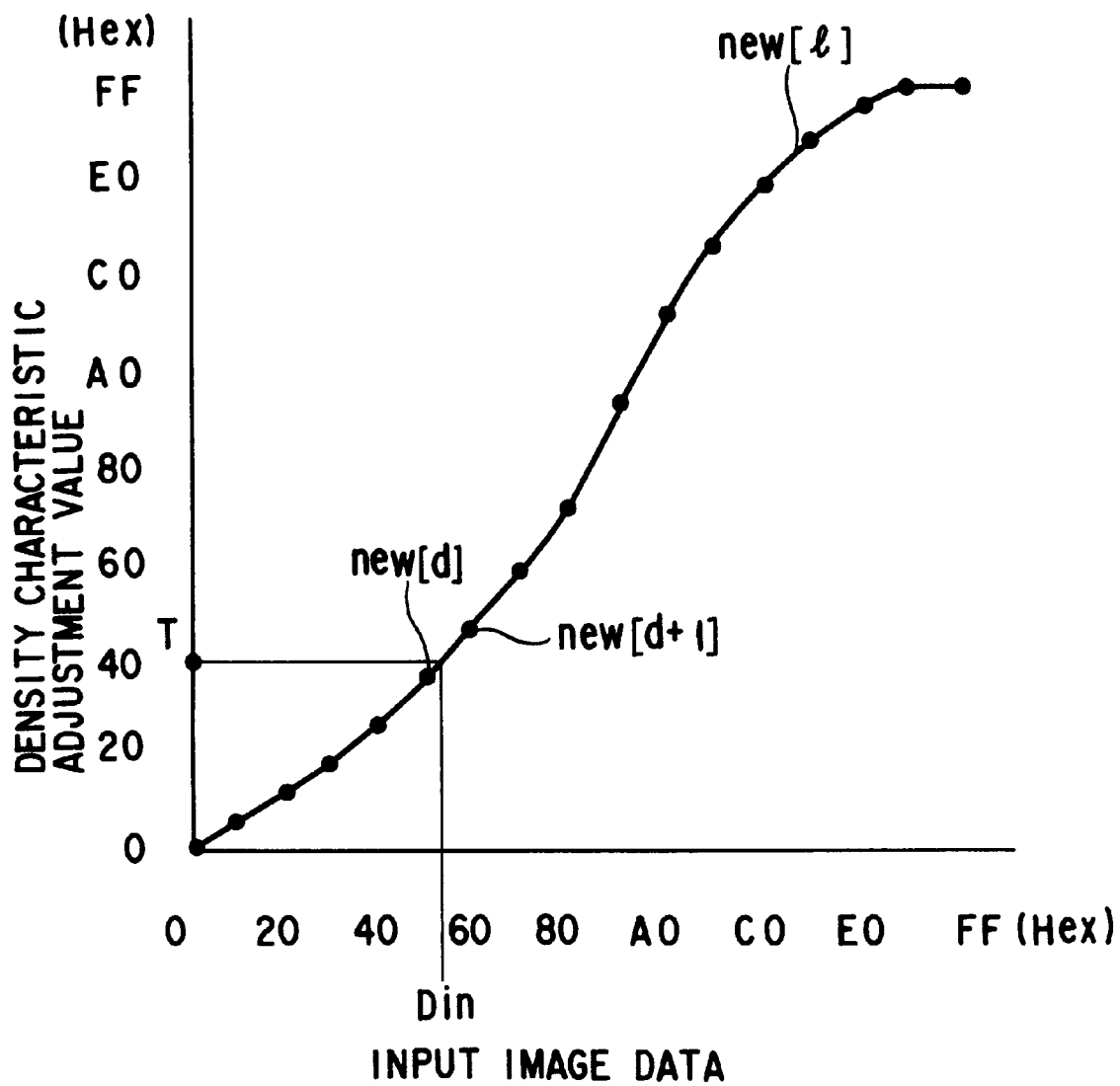
F I G. 8

IMAGE FORMING APPARATUS

BACKGROUND OF THE INVENTION

This invention relates to an image forming apparatus such as a digital copying machine for creating an image signal by reading an image of a document or the like by use of a scanner, for example, and then forming an image on paper according to the image signal by use of a laser printer.

Generally, in a digital copying machine or the like dealing with image information, an image signal read by use of reading means such as a scanner is converted into a proper form, for example, multi-density form depending on the service objective. At this time, if the entire portion or part of the read image is too light or too dark, an input image is subjected to a process for adjusting the density characteristic and then output by use of a laser printer. Conventionally, the adjustment of the density characteristic is generally made by use of a conversion table in which the relation between the density of the input image signal and the corresponding density of the output image signal is set.

The adjustment method using the conversion table necessitates a memory of a large capacity as a memory for storing conversion tables as the number of types of the conversion tables increases and the number of multi-density levels of the image increases. If the multi-density data is expressed by eight bits, it is necessary to store 8-bit values obtained after conversion and used for the adjustment for each of 256 densities which can be represented by eight bits in order to adjust the density characteristic of the image signal.

Therefore, one conversion table necessitates a capacity of 8 bits×256, and if a plurality of conversion tables are used, a memory of extremely large storage capacity is required. For example, when the density adjustment is made by use of a manual density setting button for each mode such as a photographic mode or character mode, a memory of extremely large storage capacity is required.

Further, a method using a circuit for deriving values to be stored into the conversion table on the real time basis instead of previously storing the conversion tables in the memory is provided. When the linear conversion is made, a table value deriving circuit used for this purpose can be made relatively small in scale and simple in construction, but if the conversion is made according to a complicated curved line or a curved line which cannot be expressed by an equation, a circuit complicated in construction and large in scale is necessary or the conversion cannot be attained by use of a circuit.

Further, generally, values actually converted by use of the conversion table are not values which are linearly changed before and after the conversion, and they vary along a curved line expressed by a complicated equation or cannot be expressed by an equation in most cases.

In addition, when the density adjustment is made by use of values stored in the conversion table, the content of the adjustment is limited to a range defined by the values in the conversion table and the degree of freedom of the density adjustment becomes low.

An object of this invention is to provide an image forming apparatus in which the storage capacity of a memory for storing density adjustment tables can be reduced and the density adjustment can be performed with a relatively high degree of freedom.

BRIEF SUMMARY OF THE INVENTION

An image forming apparatus of this invention comprises generation means for generating an input image signal corresponding to the density of an image; setting means for setting the density of an output image corresponding to the input image signal generated by the generation means; storage means for storing at least two sets of first density characteristic adjusting data each indicating the correspondence relation between the input image signal and the output image signal for image formation according to the density of the output image; creation means for creating second density characteristic adjusting data corresponding to the density of the output image set by the setting means by use of the two sets of first density characteristic adjusting data stored in the storage means; conversion means for converting the input image signal generated by the generation means into an output image signal by use of the second density characteristic adjusting data created by the creation means; and image forming means for forming an image on an image recording medium based on the output image signal converted by the conversion means.

An image forming apparatus of this invention comprises reading means for reading a document to generate an input image signal; setting means for setting the density of an output image corresponding to the input image signal generated by the reading means; storage means for storing three sets of first density characteristic adjusting data of dark reference, standard and light reference corresponding to the output image density and each indicating the correspondence relation between the input image signal and the output image signal for image formation; creation means for creating second density characteristic adjusting data corresponding to the density set by the setting means by use of two sets of first density characteristic adjusting data among the three sets of first density characteristic adjusting data of dark reference, standard and light reference stored in the storage means; conversion means for converting the input image signal generated by the reading means into an output image signal based on the second density characteristic adjusting data created by the creation means; and image forming means for forming an image corresponding to the output image signal converted by the conversion means on an image recording medium.

An image forming method of this invention comprises the steps of: generating an input image signal corresponding to the density of an image; setting the density of an output image corresponding to the input image signal; storing at least two sets of first density characteristic adjusting data each indicating the correspondence relation between the input image signal and the output image signal for image formation according to the density of the output image; creating second density characteristic adjusting data corresponding to the density of the output image by use of the two sets of first density characteristic adjusting data; converting the input image signal into an output image signal by use of the second density characteristic adjusting data; and forming an image on an image recording medium based on the output image signal.

An image forming method of this invention comprises the steps of: designating, in an adjusting mode, one of two sets of density characteristic adjusting data stored in a storing means for representing the correspondence relation between the density of an input image signal and the density of an output image signal for image formation; modifying the contents of the designated density characteristic adjusting data into desired data in the adjusting mode; converting the input image signal into the output image signal in accordance with the modified density characteristic adjusting data and the other of the two sets of density characteristic adjusting data in an ordinary mode; and forming an image in accordance with the converted output image signal.

An image forming method of this invention comprises the steps of: designating, in an adjusting mode, one of first printing mode and second printing mode and one of two sets of density characteristic adjusting data stored in a storing means corresponding to the first printing mode and the second printing mode, respectively, and representing the correspondence relation between the density of the input image signal and the density of an output image signal for image formation; modifying, in the adjusting mode, the contents of the designated density characteristic adjusting data into desired data; converting the input image signal into the output image signal in accordance with the density characteristic adjusting data corresponding to one printing mode and the other of the two sets of density characteristic adjusting data, when one of the first and second printing modes which is modified in the adjusting mode is set in an ordinary mode, and forming an image in accordance with the converted output image signal.

In the image forming method and apparatus according to the present invention, a density characteristic adjusting table corresponding to a set value of the density is created in the table creating section based on at least two reference data for density characteristic adjustment previously stored in the correction data table, a density characteristic adjustment value corresponding to an input image signal from the scanner is derived by effecting interpolation according to density characteristic adjustment values at two neighboring points based on the input image signal in the deriving section, the input image signal is corrected based on the thus derived density characteristic adjustment value in the density characteristic adjusting section and then the corrected image signal can be output as an output image signal to the printer section so that the storage capacity of a memory for storing the density adjustment tables can be reduced and the density adjustment can be changed with a relatively high degree of freedom.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 5 is a diagram for illustrating the contents of a light reference table, center reference table and dark reference table in each of the tables for the character/photograph mode, character mode and photograph mode and one example of the adjusting method;

FIG. 6 is a diagram for illustrating a light reference table, center reference table and dark reference table in each of the tables for the character/photograph mode, character mode and photograph mode and one example of the adjusting method;

FIG. 7 is a diagram for illustrating an example of storage data of the density characteristic adjusting table;

FIG. 8 is a diagram for illustrating an example of storage data of the density characteristic adjusting table;

DETAILED DESCRIPTION OF THE INVENTION

There will now be described an embodiment of this invention with reference to the accompanying drawings.

An embodiment in which this invention is applied to a multifunctional digital image forming apparatus having three functions of a copying machine (PPC), facsimile (FAX) and printer (PRT) is explained.

Figure 1:
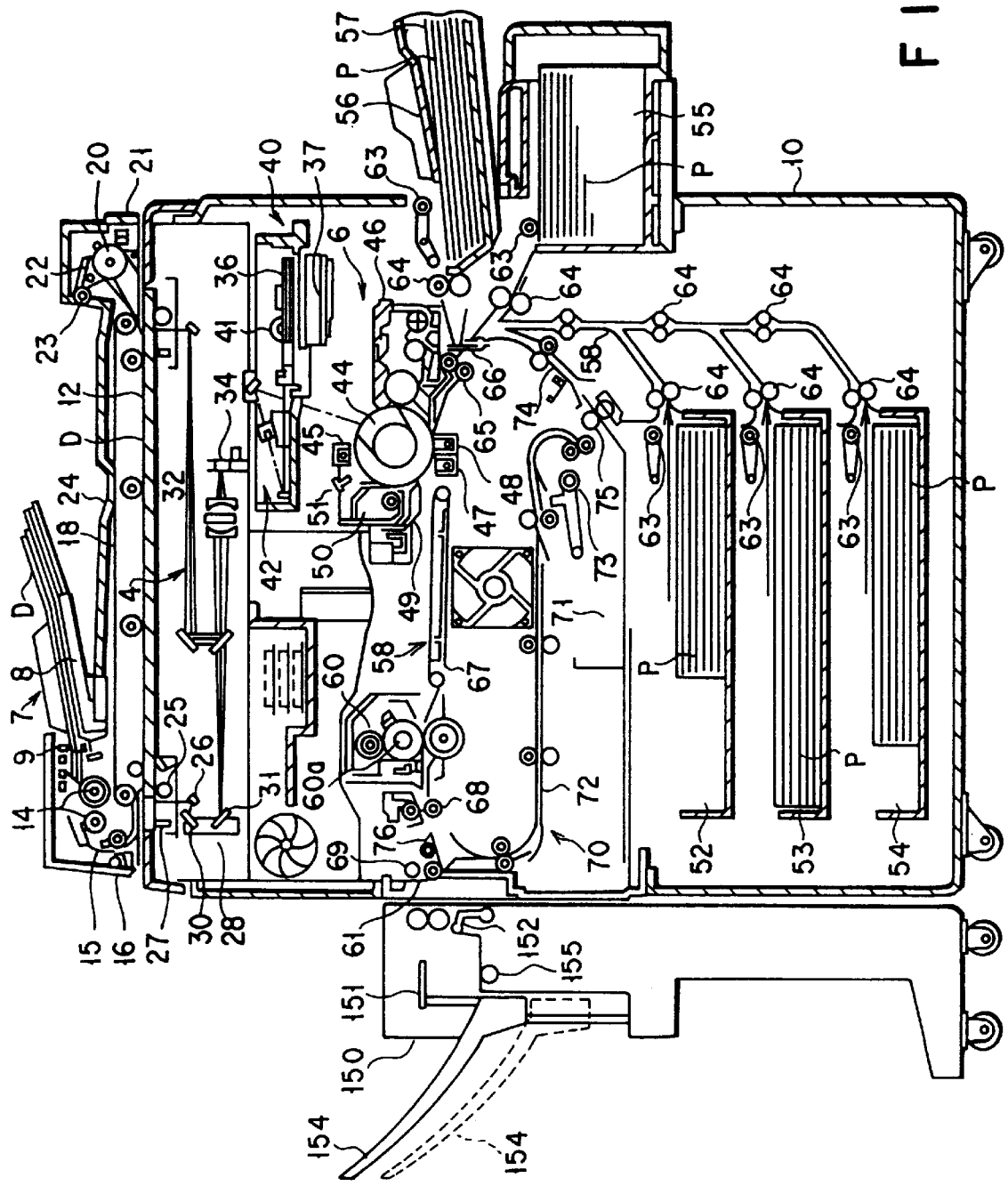
FIG. 1 is a cross sectional view showing the schematic construction of a digital copying machine for illustrating one embodiment of this invention.

FIG. 1 is a cross sectional view showing the internal structure of a digital copying machine as one embodiment of the image forming apparatus of this invention.

As shown in FIG. 1, the digital copying machine includes a main body of the apparatus, and a scanner section functioning as reading means as will be described later and a printer section functioning as image forming means are provided in the main body 10.

A document table on which an object to be read, that is, a document D is placed is provided on the upper surface of the main body 10. Further, an automatic document feeder (which is hereinafter referred to as ADF) 7 for feeding a document onto the document table 12 is arranged on the upper surface of the main body 10. The ADF 7 also functions as a document cover movably disposed to open or close the document table 12 and put the document D placed on the document table 12 closely in contact with the document table 12 made of glass, for example.

The ADF 7 includes a document tray 8, an empty sensor 9 for detecting the presence or absence of the document, a pickup roller 14 for taking out documents one at a time from the document tray 8, a paper feeding roller 15 for feeding the taken-out document, an aligning roller pair 16 for aligning the front end portion of the document, and a feeding belt 18 arranged to cover substantially the whole portion of the document table 12. A plurality of documents set in the document tray 8 with the upper surfaces thereof facing up are sequentially taken from the bottom one, that is, the last page, aligned by the aligning roller pair 16 and then fed to a preset position of the document table 12 by the feeding belt 18.

In the ADF 7, a reversing roller 20, non-reverse sensor 21, flapper 22 and paper discharging roller 23 are disposed on an end portion opposite to the aligning roller pair 16 with the feeding belt 18 set therebetween.

The document D whose image information is read by the scanner 4 which will be described later is fed out from the document table 12 and discharged onto a document discharging section 24 on the upper surface of the ADF 7 via the reversing roller 20, flapper 22 and paper discharging roller 23. When the undersurface of the document D is read, the document D fed by the feeding belt 18 by switching the position of the flapper 22 is reversed by the reversing roller 20 and then fed to a preset position on the document table 12 by the feeding belt 18.

The scanner section 4 disposed in the main body 10 includes an exposure lamp 25 used as a light source for illuminating the document D placed on the document table 12 from the underside and a first mirror 26 for deflecting light reflected from the document D in a preset direction, and the exposure lamp 25 and first mirror 26 are mounted on a first carriage 27 disposed below the document table 12.

The first carriage 27 is disposed so as to move in parallel to the document table 12 and is moved back and forth beneath the document table 12 by a driving motor via a toothed belt (not shown) or the like.

Further, a second carriage 28 which can move in parallel to the document table 12 is disposed below the document table 12. Second and third mirrors 30, 31 which sequentially deflect the light reflected from the document D and deflected by the first mirror 26 are disposed at right angles on the second carriage 28. The second carriage 28 is driven by the toothed belt which drives the first carriage 27 to follow the first carriage 27 and is moved in parallel to the document table 12 at a speed half that of the first carriage 27.

In addition, an image forming lens 32 for converging the light reflected from the mirror 31 on the second carriage 28 and a CCD sensor 34 for receiving the light converged by the image forming lens 32 and subjecting the received light to photoelectric conversion are disposed below the document table 12. The image forming lens 32 is disposed to be moved via a driving mechanism in a plane containing the optical axis of the light deflected by the third mirror 31 and it forms an image based on the reflected light with a desired magnification according to the movement thereof. Then, the CCD sensor 34 subjects the received reflected light to photoelectric conversion and outputs an electric signal corresponding to the read image of the document D.

The printer section 6 includes a laser exposure device 40 acting as electrostatic latent image forming means. The laser exposure device 40 includes a semiconductor laser 41 used as a light source, a polygon mirror 36 acting as a scanning member for continuously deflecting laser light emitted from the semiconductor laser 41, a polygon motor 37 acting as a scan motor for rotating the polygon mirror 36 at a preset rotation speed which will be described later, and an optical system 42 for deflecting the laser light from the polygon mirror and guiding the same to a photosensitive drum 44 which will be described later.

The laser exposure device 40 with the above construction is fixedly supported on a supporting frame (not shown) of the main body 10 of the apparatus.

The semiconductor laser 41 is controlled into the ON or OFF state to emit laser light according to image information of the document D read by the scanner section 4 or document information for facsimile transmission/reception, and the laser light is supplied to the photosensitive drum 44 via the polygon mirror 36 and optical system 42 and scans the peripheral surface of the photosensitive drum 44 so as to form an electrostatic latent image on the peripheral surface of the photosensitive drum 44.

Further, the rotatable photosensitive drum 44 acts as an image carrier and is disposed at substantially the central portion of the main body 10. The peripheral surface of the photosensitive drum 44 is exposed to the laser light from the laser exposure device 40 and a desired electrostatic latent image is formed thereon. An electric charger 45 for charging the peripheral surface of the drum 44 to a preset potential, a developer 46 for supplying toner as developing powder to the electrostatic latent image formed on the peripheral surface of the photosensitive drum 44 to develop the latent image with a desired image density, a transfer charger 48 integrally having a separation charger 47 for separating an image recording medium, that is, copy paper P supplied from a paper cassette which will be described later from the photosensitive drum 44 and acting to transfer a toner image formed on the photosensitive drum 44 to the paper P, a separation claw 49 for separating the paper P from the peripheral surface of the photosensitive drum 44, a cleaning device 50 for cleaning toner remaining on the peripheral surface of the photosensitive drum 44 and a discharging unity 51 for discharging the remaining charges on the peripheral surface of the photosensitive drum 44 are sequentially disposed around the photosensitive drum 44.

On the lower portion in the main body 10, an upper-stage cassette 52, middle-stage cassette 53 and lower-stage cassette 54 which can be drawn from the main body of the apparatus are arranged in a stacked form and sheets of copy paper P with different sizes, for example, B5-size, B4-size and A4-size are received in the respective cassettes. A large-capacity feeder 55 is disposed on the side portion of the cassettes and approx. 3000 sheets of copy paper P of a size which is frequently used, for example, copy paper P of A4-size are stored in the large-capacity feeder 55. A paper feeding cassette 57 which is also used as a manual paper-feeding tray 56 is removably mounted above the large-capacity feeder 55.

In the main body 10, a feeding path 58 which extends from the cassettes 52, 53, 54 and large-capacity feeder 55 through a transferring section lying between the photosensitive drum 44 and the transfer charger 48 is formed and a fixing device 60 having a fixing lamp 60a is disposed at the end portion of the feeding path 58. A paper discharging port 61 is formed in the side wall of the main body 10 in position opposite to the fixing device 60 and a finisher 150 of single tray is disposed at the paper discharging port 61.

Pickup rollers 63 each for taking out the copy paper P one sheet at a time from a corresponding one of the cassettes 52–54 or the large-capacity feeder 55 are provided near the upper-stage cassette 52, middle-stage cassette 53, lower-stage cassette 54, paper feeding cassette 57 and large-capacity feeder 55. Further, a large number of paper feeding roller pairs 64 for feeding the copy paper P taken out by the pickup roller 63 along the feeding path 58 are disposed on the feeding path 58.

A register roller pair 65 is disposed on the feeding path 58 on the upstream side of the photosensitive drum 44. The register roller pair 65 corrects the inclination of the taken-out copy paper P, aligns the front end of the toner image on the photosensitive drum 44 with the front end of the copy paper P and feeds the copy paper P to the transferring section at the same speed as the circumferential speed of the photosensitive drum 44. On the front side of the register roller pair 65, that is, on the side of the paper feeding roller 64, an unaligned state sensor 66 for detecting arrival of the copy paper P is disposed.

The copy paper P taken out one sheet at a time from the cassettes 52, 53, 54 or the large-capacity feeder 55 by the pickup roller 63 is fed to the register roller pair 65 by the paper feeding roller pairs 64. Then, the front end of the copy paper P is aligned by the register roller pair 65 and the copy paper is fed to the transferring section.

In the transferring section, a developer image or a toner image formed on the photosensitive drum 44 is transferred on the paper P by the transfer charger 48. The copy paper P having the toner image transferred thereon is separated from the peripheral surface of the photosensitive drum 44 by the action of the separation charger 47 and the separation claw 49 and then fed to the fixing device 60 via the feeding belt 67 constructing apart of the feeding path 58. After the developer image is melted and fixed on the copy paper P by the fixing device 60, the copy paper P is discharged onto the finisher 150 via the discharging port 61 by the paper feeding roller pair 68 and paper discharging roller pair 69.

An automatic double face setting device 70 for reversing the copy paper P which has passed the fixing device 60 and feeding the copy paper to the register roller pair 65 again is disposed below the feeding path 58. The automatic double face setting device 70 includes a temporary storing section 71 for temporarily storing the copy paper P, a reversing path 72 for reversing the copy paper P which has been separated from the feeding path 58 and passed through the fixing device 60 and then supplying the copy paper to the temporary storing section 71, a pickup roller 73 for taking out the copy paper P one sheet at a time from the temporary storing section 71, and a paper feeding roller 75 for feeding the taken-out paper to the register roller pair 65 via a feeding path 74. In the branching portion of the feeding path 58 and the reversing path 72, a distributing gate 76 for selectively distributing the copy paper P to the paper discharging port 61 or reversing path 72 is disposed.

In order to make copies on both sides of the copy paper, the copy paper P which has passed through the fixing device 60 is supplied to the reversing path 72 by the distributing gate 76, temporarily stored in the temporary storing section 71 in the reversed state, and then fed to the register roller pair 65 via the feeding path 74 by the pickup roller 73 and paper feeding roller 75. After this, the copy paper P is aligned by the register roller and fed to the transferring section again, and a toner image is transferred onto the undersurface of the copy paper P. Then, the copy paper P is discharged to the finisher 150 via the feeding path 58, fixing device 60 and paper discharging roller 69.

The finisher 150 staples documents discharged and constructing one copy together for each copy unit and store them. Each time one sheet of copy paper P to be stapled is discharged from the discharging port 61, the finisher pushes the copy paper towards the side on which it is to be stapled by use of a guide bar 151 and aligns the same. When all of the sheets of copy paper are discharged, the sheets of copy paper P of one copy unit discharged are pressed down by a paper pressing arm 152 and a stapler unit (not shown) staples them together. After this, the guide bar 151 is lowered and the sheets of copy paper P which are stapled are discharged to the finisher discharging tray 154 by the finisher discharging roller 155 for each copy unit. The distance of the finisher discharging tray 154 to be lowered is approximately determined by the number of sheets of copy paper P to be discharged and the tray is lowered in a stepwise fashion each time the documents of one copy unit is discharged. The guide bar 151 for aligning the copy paper P to be discharged is set in such a high position that it will not collide with the copy paper P which is already stapled and disposed on the finisher discharging tray 154.

The finisher discharging tray 154 is connected to a shifting mechanism (not shown) for shifting the documents of each copy unit (for example, in four directions of front, rear, right and left) in the sorting mode.

Figure 2:
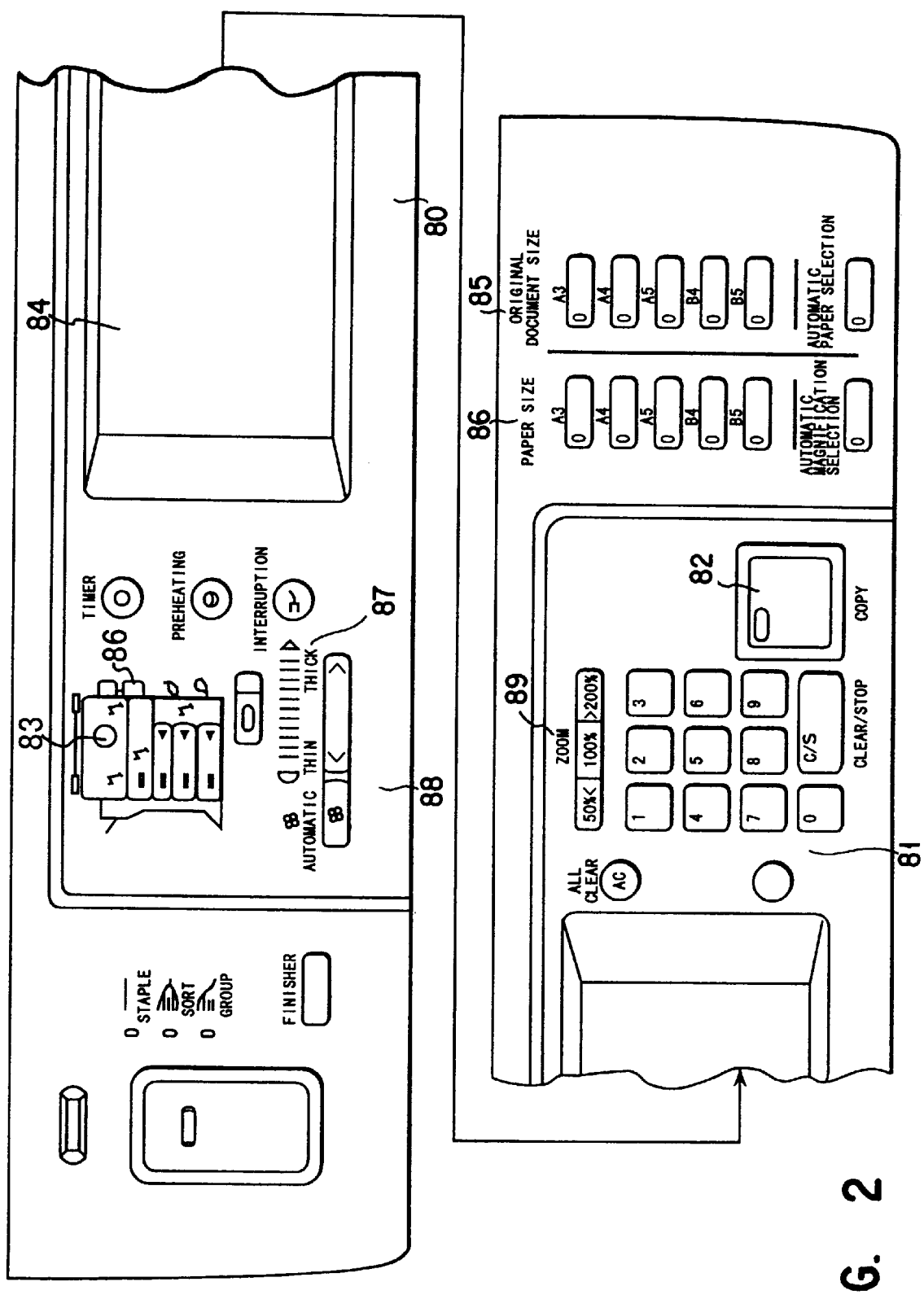
FIG. 2 is a plan view showing the construction of an operation panel in the embodiment of FIG. 1.

Further, on the upper portion of the front surface of the main body 10 of the apparatus, an operation panel 80 of FIG. 2 for inputting a copy starting signal for starting the copying operation and signals indicating various copying conditions and the like is arranged.

As shown in FIG. 2, the operation panel 80 includes a ten-key portion 81, copy key 82, status display section 83, liquid crystal display section 84, document size setting key 85, paper size setting key 86, density display section 87, density setting key 88 and magnification setting key 89.

The ten-key 81 is used to set the number of document units and the number of sheets of copy paper.

The copy key 82 is used to indicate starting of the copying operation.

The status display section 83 displays the selection state of the paper feeding cassette and jam of the documents and copy paper.

The liquid crystal display section 84 displays the number of document units and the number of sheets of copy paper, displays the magnification of copy and edition thereof and gives guidance as to various kinds of operations. A touch panel is provided on the liquid crystal display section 84, and various operation instructions such as input of the selection key can be made by the touch operation. For example, selection keys of photograph mode, character mode and character/photograph mode as the document mode are displayed and can be selected.

One of the paper size setting keys 86 is used to set the size of the paper P.

The density display section 87 displays the copy density set by the density setting key 88.

The magnification setting key 89 is used to set the copying magnification.

Figure 3:
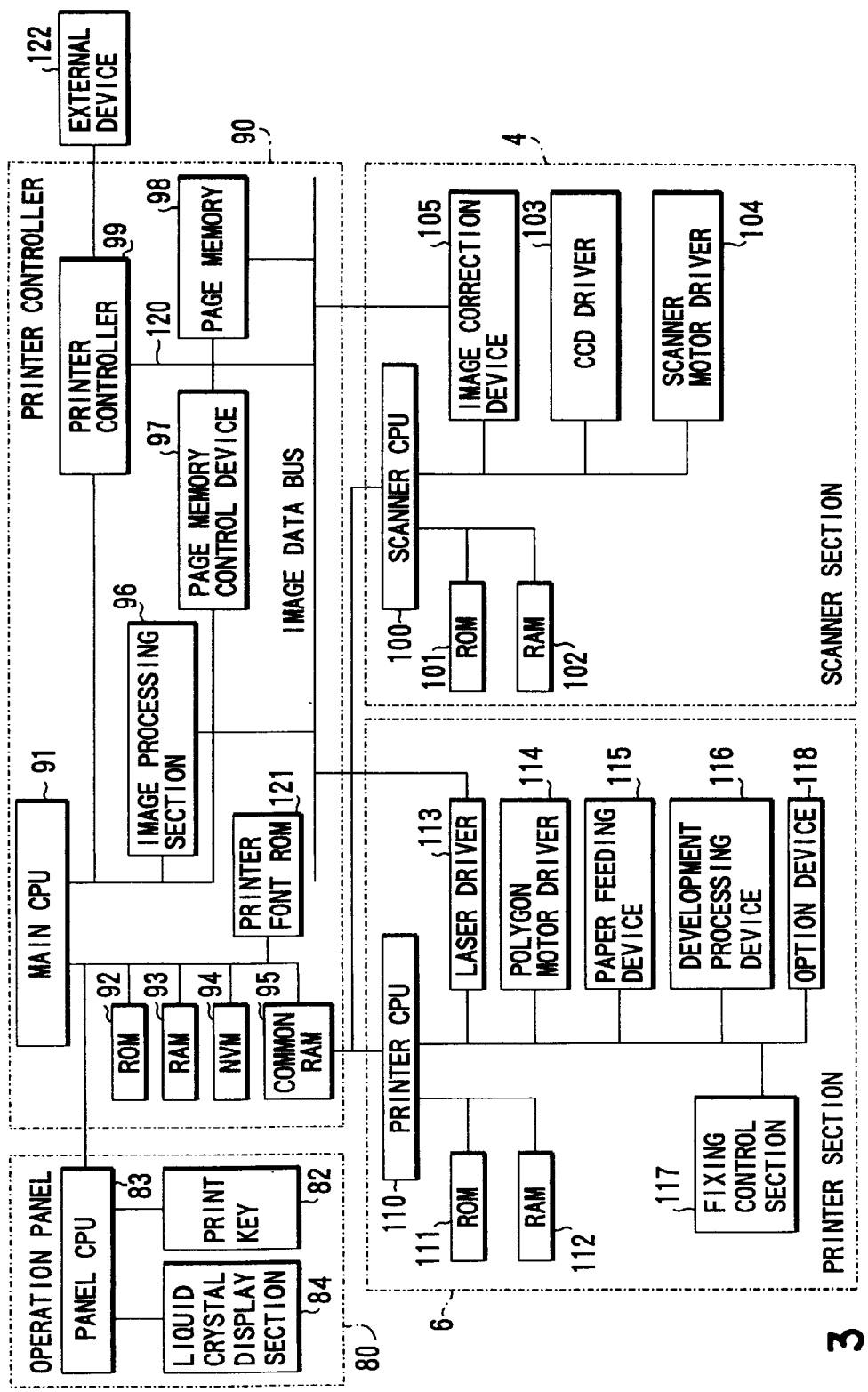
FIG. 3 is a block diagram showing the schematic construction of the digital copying machine shown in FIG. 1.

FIG. 3 is a block diagram schematically showing the electrical connection of the digital copying machine in FIG. 1 and the flow of a signal for controlling. As shown in FIG. 3, the digital copying machine includes four CPUs, that is, a main CPU 91 in a main control section 90, a scanner CPU 100 of the scanner section 4, a printer CPU 110 of the printer section 6 and an operation CPU 83 of the operation panel 80. The main CPU 91 performs bi-directional communication with the printer CPU 110 via a common RAM 95, the main CPU 91 issues an operation instruction and the printer CPU 110 feeds back a status signal. The printer CPU 110 and scanner CPU 100 perform serial communication, the printer CPU 110 issues an operation instruction and the scanner CPU 100 feeds back a status signal.

The panel CPU 83 of the operation panel 80 is connected to the main CPU 91.

The main control section 90 includes the main CPU 91, ROM 92, RAM 93, NVM 94, common RAM 95, image processing section 96, page memory control section 97, page memory 98, printer controller 99 and printer font ROM 121.

The main CPU 91 controls the whole portion of the main control section 90. A control program is stored in the ROM 92. The RAM 92 temporarily stores data.

The NVM (nonvolatile random access memory: nonvolatile RAM) 94 is a nonvolatile memory backed up by a battery (not shown) and data on the NVM 94 can be held even when the main power source of the apparatus is turned OFF.

The common RAM 95 is used to perform bi-directional communication between the main CPU 91 and the printer CPU 110.

The page memory control section 97 stores image data into the page memory 98 or reads out data from the page memory 98. The page memory 98 has an area capable of storing image data of plural pages and is formed to store data obtained by compressing image data from the scanner section 4 for each page.

Font data corresponding to print data is stored in the printer font ROM 121.

The printer controller 99 expands print data from an external device 122 such as a personal computer into image data with resolution corresponding to data indicating the resolution attached to the print data by use of font data stored in the printer font ROM 121.

The scanner section 4 includes the scanner CPU 100 for controlling the whole portion of the scanner section 4, a ROM 101 in which a control program and the like are stored, a RAM 102 for storing data, a CCD driver 103 for driving the CCD sensor 34, a scanner motor driver 104 for controlling the rotation of motors for driving the mirrors 26, 27, 28 and the exposure lamp 25, and an image correcting section 105 is constructed by an A/D converter circuit for converting an analog signal from the CCD sensor 34 into a digital signal, a shading correction circuit for correcting a variation in the threshold level with respect to an output signal from the CCD sensor 34 caused by a variation in the operation characteristic of the CCD sensor 34 or a variation in the ambient temperature, and a line memory for temporarily storing the digital signal subjected to the shading correction from the shading correction circuit.

The printer section 6 includes the printer CPU 110 for controlling the whole portion of the printer section 6, a ROM 111 in which a control program and the like are stored, a RAM 112 for storing data, a laser driver 113 for turning ON/OFF the light emitting state of the semiconductor laser 41, a polygon motor driver 114 for controlling the rotation of the polygon motor 37 of the laser unit 40, a paper feeding section 115 for controlling the operation of feeding the paper P along the feeding path 58, a development processing section 116 for effecting the charging, developing and transferring operations by use of the electric charger 45, developing device 46 and transfer charger 48, a fixing control section 117 for controlling the fixing device 60 and an option section 118.

Further, the image processing section 96, page memory 98, printer controller 99, image correcting section 105 and laser driver 113 are connected via an image data bus 120.

Figure 4:
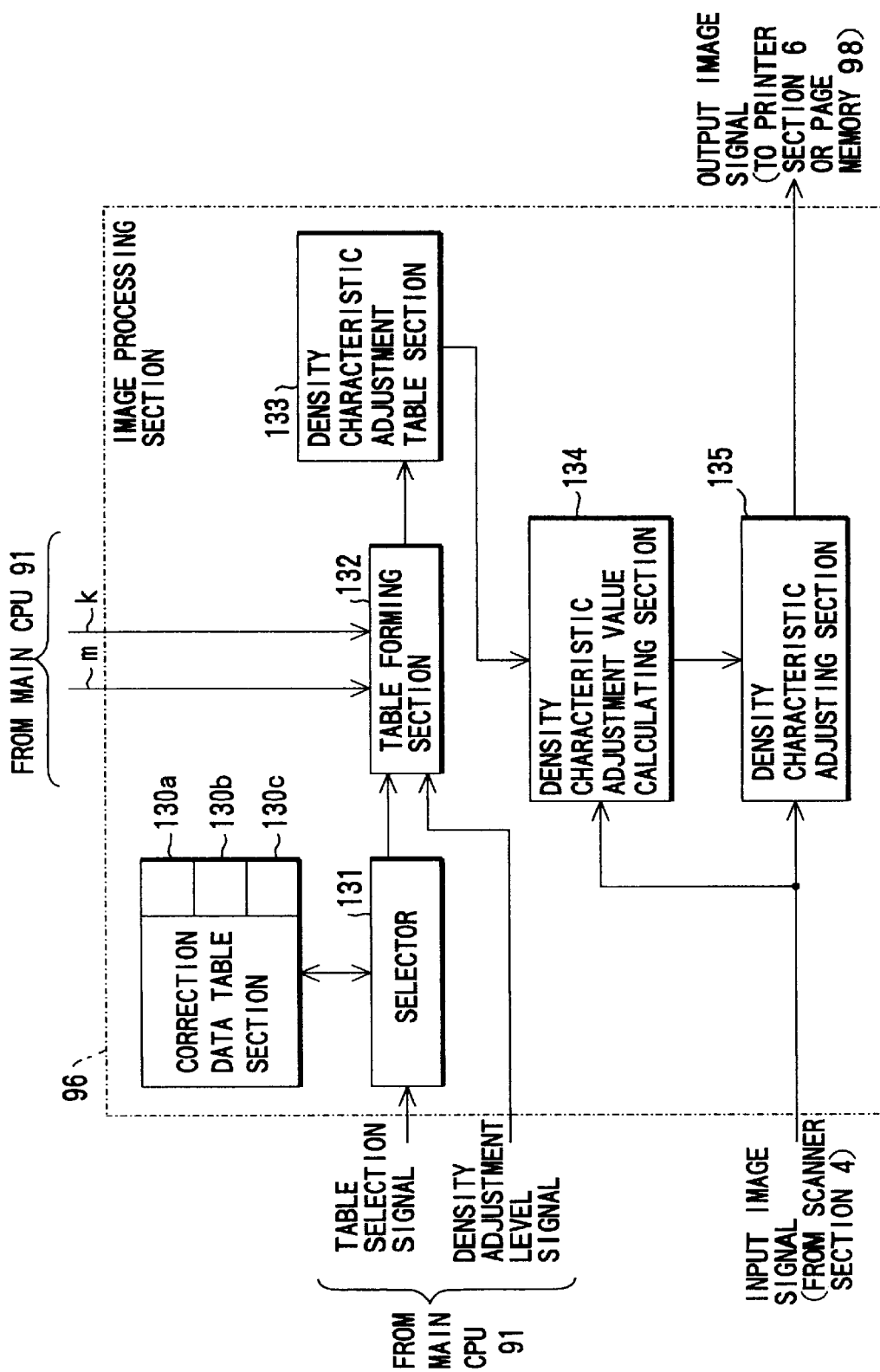
FIG. 4 is a block diagram showing the schematic construction of an image processing section of FIG. 3.

As shown in FIG. 4, the image processing section 96 includes a correction data table section 130, selector 131, table forming section 132, density characteristic adjusting table section 133, density characteristic adjustment value calculating section 134, and density characteristic adjusting section 135.

Correction data items for density characteristic adjustment for various modes are stored in the correction data table section 130. In this case, three reference tables are stored as one set in each of the mode tables 130a, 130b and 130c respectively provided for the character/photograph mode, character mode and photograph mode.

As shown in FIG. 5 or 6, each of the mode tables 130a, 130b, 130c has three reference tables each of which has n values for dividing 8-bit data into (n−1) portions. The three reference tables are referred to as a dark reference table, center (standard) reference table and light reference table arranged in order from the left. In this case, n takes a value in a range from 2 to the maximum value of the multi-density values (256 when the multi-density-coding number is 8 bits).

In this embodiment, a case wherein the multi- density level at the image input/output time is represented by eight bits is explained. For example, density characteristic adjustment values for the respective density gradations of 16 gradations of an input image signal of 0 to 255 (00 to FFh) are stored as shown in FIG. 5 or input image signal values for the respective density gradations of 16 gradations of a density characteristic adjusting signal of 0 to 255 (00 to FFh) are stored as shown in FIG. 6 in the dark reference table, center reference table and light reference table, respectively.

The input image signal values and density characteristic adjustment values stored in the dark reference table, center reference table and light reference table are different from one another.

The selector 131 in FIG. 4 selectively outputs the storage content of the dark reference table, center reference table, light reference table of one of the mode tables 130a, 130b, 130c of the character/photograph mode, character mode or photograph mode to the table forming section 132 in response to a table selection signal supplied from the main CPU 91 according to the character/photograph mode, character mode or photograph mode set by the operation on the operation panel 80.

The table forming section 132 calculates density characteristic adjustment values for the respective density gradations of 16 gradations of an input image signal of 0 to 255 (00 to FFh) as shown in FIGS. 7 and 8, for example, based on the storage content of the table of the character/photograph mode, character mode or photograph mode selected by the selector 131, that is, the storage content of the dark reference table, center reference table, light reference table and a density adjustment level signal (m,k) supplied from the main CPU 91 in response to the manual density setting operation or automatic density setting operation effected on the operation panel 80, then forms a density characteristic adjusting table and stores the same into the density characteristic adjusting table section 133. The content of the density characteristic adjusting table stored in the density characteristic adjusting table section 133 is output to the density characteristic adjustment value calculating section 134.

The density characteristic adjustment value calculating section 134 calculates a density characteristic adjustment value corresponding to an input image signal supplied from the image correcting section 105 of the scanner section 4 via the image data bus 120 on the real time basis based on the density characteristic adjustment values for the respective density gradations of 16 gradations of an input image signal stored in the density characteristic adjusting table 133, and the density characteristic adjustment value thus calculated is output to the density characteristic adjusting section 135.

The density characteristic adjusting section 135 adjusts the density characteristic for an input image signal supplied from the image correcting section 105 of the scanner section 4 via the image data bus 120 according to the density characteristic adjustment value supplied from the density characteristic adjustment value calculating section 134, and an output image signal whose density characteristic is adjusted is output to the page memory 98 or the laser driver 113 of the printer section 6 via the image data bus 120.

Further, in the image processing section 96, it is possible to provide a filtering circuit used for noise elimination or the like, an enlarging/reducing circuit for enlarging or reducing the size of an image, and a gradation processing circuit for attaining an improved image although the gradation of the image is degraded.

Next, the density characteristic adjusting table forming process in the image processing section 96 is explained.

The selector 131 selectively outputs the storage content of the dark reference table, center reference table, light reference table of one of the mode tables 130a, 130b, 130c of the character/photograph mode, character mode or photograph mode to the table forming section 132 in response to a table selection signal supplied from the main CPU 91 according to the character/photograph mode, character mode or photograph mode set by the operation on the operation panel 80.

The table forming section 132 calculates density characteristic adjustment values for the respective density gradations of 16 gradations of an input image signal of 0 to 255 (00 to FFh) based on the storage content of the dark reference table, center reference table or light reference table supplied from the selector 131 and a density adjustment level signal (m,k) supplied from the main CPU 91 in response to the manual density setting operation or automatic density setting operation effected on the operation panel 80, then forms a density characteristic adjusting table and stores the same into the density characteristic adjusting table section 133.

The density characteristic adjusting table forming method includes the following two methods.

In the case of the first forming method, a density characteristic adjusting table is formed by use of the dark reference table, center reference table or light reference table in which density characteristic adjustment values corresponding to the reference densities of the input image signal obtained by equally dividing the range of the input image signal as shown in FIG. 5 are stored, and in the case of the second forming method, a density characteristic adjusting table is formed by use of the dark reference table, center reference table or light reference table in which density values of an input image signal corresponding to the reference densities obtained by equally dividing the range of the density characteristic adjustment values as shown in FIG. 6 are stored.

(First Forming Method) Suppose that data items in the three tables in each mode table are set as follows:

dark reference table: dark[l] (l=0, 1, 2, . . . , (n−1))
center reference table: center[l] (l=0, 1, 2, . . . , (n−1))
light reference table: light[l] (l=0, 1, 2, . . . , (n−1))

Further, a portion between points at which l is set at the same value is divided into m×k portions (m: the number of divisions, k: the number of steps, they are positive integral numbers and set by the main CPU 91). The values "0" to "n−1" of l correspond to 0, 10, 20, 30 . . . d0, e0, f0, ff obtained by dividing 8-bit data by n=17. If m and k are respectively set to 5 and 20 (default values), m×k=100.

As a result, a density characteristic adjusting table new[l] newly derived when the density adjusting level is d can be derived as follows.

When the density adjusting level (d) is "+" (indicating a direction in which the density increases), a density characteristic adjusting table newly derived is obtained between the dark reference table and the center reference table and derived according to the following equation.

$$\text{new}[l] = \text{center}[l] + \{(\text{dark}[l] - \text{center}[l])/(m \times k1)\} \times k2 \times d + k3$$

where k1=k2=k and k3 is a fine adjustment amount of the center reference.

On the other hand, when the density adjusting level (d) is "−" (indicating a direction in which the density is lowered), a density characteristic adjusting table newly derived is obtained between the light reference table and the center reference table and derived according to the following equation.

$$\text{new}[l] = \text{center}[l] - \{(\text{center}[l] - \text{light}[l])/(m \times k1)\} \times k2 \times d + k3$$

where k1=k2=k and k3 is a fine adjustment amount of the center reference.

Further, fine adjustment can be made for the center reference by treating a number divided by m×n as one unit and shifting the center reference value in the vertical direction in the case of FIG. 5 and the rate of variation for one density adjustment level can be changed by setting k1 and k2 to different values.

Also, fine adjustment can be made for the light reference data and dark reference data in the same manner as in the case of the center reference.

(Second Forming Method)

Suppose that data items in the three tables are set as follows:

dark reference table: dark[l] (l=0, 1, 2, . . . , (n−1))
center reference table: center[l] ((l=0, 1, 2, . . . , (n−1))
light reference table: light[l] (l=0, 1, 2, . . . , (n−1))

In this case, values of the respective reference tables on the x axis obtained when center[l] is set to 0, 10, 20, 30 . . . d0, e0, f0, ff are defined as follows:

l obtained when dark[l]=0, 10, 20, 30 . . . d0, e0, f0, ff is d[l];
l obtained when center[l]=0, 10, 20, 30 . . . d0, e0, f0, ff is c[l]; and
l obtained when light[l]=0, 10, 20, 30 . . . d0, e0, f0, ff is l[l].

At this time, a portion between points at which l is set at the same value is divided into m×k portions (m and k are positive integral numbers). If m and k are respectively set to 5 and 20, a portion between the center reference and the dark reference and a portion between the center reference and the light reference have m×k=100 divisions as shown in FIG. 6.

Also, in the case of FIG. 6, a density characteristic adjusting table new[l] newly derived when the density adjusting level is d can be derived as follows.

When the density adjusting level is "+" (indicating a direction in which the density increases), a density characteristic adjusting table new[l] newly derived is obtained between the dark reference table and the center reference table and derived according to the following equation.

$$\text{new}[l] = \text{center}[l] - \{(\text{center}[l] - \text{dark}[l])/(m \times k1)\} \times k2 \times d + k3$$

where k1=k2=k and k3 is a fine adjustment amount of the center reference.

On the other hand, when the density adjusting level is "−" (indicating a direction in which the density is lowered), a density characteristic adjusting table newly derived is obtained between the light reference table and the center reference table and derived according to the following equation.

$$\text{new}[l] = \text{center}[l] + \{(\text{light}[l] - \text{center}[l])/(m \times k1)\} \times k2 \times d + k3$$

where k1=k2=k and k3 is a fine adjustment amount of the center reference.

Accordingly, l corresponding to new[l]=0, 10 . . . FF is obtained as n[l].

Further, like the case of FIG. 5, fine adjustment can be made for the dark reference, center reference, light reference by treating a number divided by m×n as one unit and shifting the corresponding reference in the horizontal direction and the rate of variation for one density adjustment level can be changed by setting k1 and k2 to different values.

Now, a process effected at the time of adjustment of the reference is explained.

That is, when an operator turns ON a power source switch (not shown) while depressing the "0" key and "5" key of the ten-key 81, the main CPU 91 determines that the adjustment mode is specified and displays the guidance for input of a code according to the content of the adjustment on the liquid crystal display section 84.

When the operator inputs "1" in a code form by use of the ten-key 81 according to the guidance, the main CPU 91 determines that a change of the density adjustment center reference value of the character/photograph mode is specified and displays the guidance for the default value and an alteration key for changing the value on the liquid crystal display section 84. When the operator changes the default value by use of the alteration key according to the guidance, the main CPU 91 changes the values (for example, the density characteristic adjustment values or input image signal values shown in FIG. 5 or 6) of the center reference table stored in the table 130a of the character/photograph mode in the correction data table section 130.

When the operator inputs "2" in a code form by use of the ten-key 81 according to the guidance of the code input, the main CPU 91 determines that a change of the density adjustment center reference value of the character mode is specified and displays the guidance for the default value and an alteration key for changing the value on the liquid crystal display section 84. When the operator changes the default value by use of the alteration key according to the guidance, the main CPU 91 changes the density characteristic adjustment values or input image signal values of the center reference table stored in the table 130b of the character mode in the correction data table section 130.

Likewise, when the operator inputs "3" in a code form by use of the ten-key 81 according to the guidance of the code input, the main CPU 91 determines that a change of the density adjustment center reference value of the photograph mode is specified and displays the guidance for the default value and an alteration key for changing the value on the liquid crystal display section 84. When the operator changes the default value by use of the alteration key according to the guidance, the main CPU 91 changes the density characteristic adjustment values or input image signal values of the center reference table stored in the table 130c of the photograph mode in the correction data table section 130.

When the operator inputs "4" in a code form by use of the ten-key 81 according to the guidance of the code input, the main CPU 91 determines that a change of the density adjustment light reference value and density step of the character/photograph mode is specified and displays the guidance for an alteration key for changing the default value on the liquid crystal display section 84. When the operator changes the default value by use of the alteration key according to the guidance, the values of the light reference table stored in the table 130a of the character/photograph mode in the correction data table section 130 are changed by means of the main CPU 91 and k (k2 in the equation of "light") supplied to the table forming section 132 is also changed.

When the operator inputs "5" in a code form by use of the ten-key 81 according to the guidance of the code input, the main CPU 91 determines that a change of the density adjustment dark reference value and density step of the character/photograph mode is specified and displays the guidance for an alteration key for changing the default value on the liquid crystal display section 84. When the operator changes the default value by use of the alteration key according to the guidance, the values of the dark reference table stored in the table 130a of the character/photograph mode in the correction data table section 130 are changed under the control of the main CPU 91 and k (k2 in the equation of "dark") supplied to the table forming section 132 is also changed.

Further, when the operator inputs "6" in a code form by use of the ten-key 81 according to the guidance of the code input, the main CPU 91 determines that a change of the density adjustment light reference value and density step of the character mode is specified and displays the guidance for an alteration key for changing the default value on the liquid crystal display section 84. When the operator changes the default value by use of the alteration key according to the guidance, the values of the light reference table stored in the table 130b of the character mode in the correction data table section 130 are changed by means of the main CPU 91 and k (k2 in the equation of "light") supplied to the table forming section 132 is changed.

When the operator inputs "7" in a code form by use of the ten-key 81 according to the guidance of the code input, the main CPU 91 determines that a change of the density adjustment dark reference value and density step of the character mode is specified and displays the guidance for an alteration key for changing the default value on the liquid crystal display section 84. When the operator changes the default value by use of the alteration key according to the guidance, the values of the dark reference table stored in the table 130b of the character mode in the correction data table section 130 are changed by means of the main CPU 91 and k (k2 in the equation of "dark") supplied to the table forming section 132 is changed.

When the operator inputs "8" in a code form by use of the ten-key 81 according to the guidance of the code input, the main CPU 91 determines that a change of the density adjustment light reference value and density step of the photograph mode is specified and displays the guidance for an alteration key for changing the default value on the liquid crystal display section 84. When the operator changes the default value by use of the alteration key according to the guidance, the values of the light reference table stored in the table 130c of the photograph mode in the correction data table section 130 are changed by means of the main CPU 91 and k (k2 in the equation of "light") supplied to the table forming section 132 is changed.

When the operator inputs "9" in a code form by use of the ten-key 81 according to the guidance of the code input, the main CPU 91 determines that a change of the density adjustment dark reference value and density step of the photograph mode is specified and displays the guidance for an alteration key for changing the default value on the liquid crystal display section 84. When the operator changes the default value by use of the alteration key according to the guidance, the values of the dark reference table stored in the table 130c of the photograph mode in the correction data table section 130 are changed under the control of the main CPU 91 and k (k2 in the equation of "dark") supplied to the table forming section 132 is changed.

For example, in the case of FIG. 5, the step number of the default value is "20" and the number of density changing points is five on each of the dark side and light side, and if the step number is reduced to "19" or less, the distance between the curve of the dark reference table and the curve of the light reference table (the interval between the curves based on the density characteristic adjustment values) is reduced in the vertical direction, and if the step number is increased to "21" or more, the distance between the curve of the dark reference table and the curve of the light reference table (the interval between the curves based on the density characteristic adjustment values) is extended in the vertical direction.

Further, in the case of FIG. 6, the step number of the default value is "20" and the number of density changing points is five on each of the dark side and light side, and if the step number is reduced to "19" or less, the distance between the curve of the dark reference table and the curve of the light reference table (the interval between the curves based on the input image signal values) is reduced in the horizontal direction, and if the step number is increased to "21" or more, the distance between the curve of the dark reference table and the curve of the light reference table (the interval between the curves based on the input image signal values) is extended in the horizontal direction.

Thus, the contents of the center reference, dark reference, light reference can be changed by simple means and a high degree of freedom can be attained.

Next, a process effected in the density characteristic adjustment value calculating section 134 when a density characteristic adjustment value is calculated is explained.

The density characteristic adjustment value calculating section 134 calculates a density characteristic adjustment value corresponding to an input image signal supplied from the image correcting section 105 of the scanner section 4 via the image data bus 120 on the real time basis based on the density characteristic adjustment values for the respective density gradations of 16 gradations of an input image signal stored in the density characteristic adjusting table 133.

For example, density characteristic adjustment values for the respective values of the input image signal are stored in the density characteristic adjusting table 133 as shown in FIG. 7. The density characteristic adjustment value calculating section 134 calculates a density characteristic adjustment value by effecting the linear interpolation according to two density characteristic adjustment values corresponding to the input image signal values stored in the table 133 in values upper and lower the supplied input image signal value based on the supplied input image signal value.

That is, the density characteristic adjustment value is calculated according to the following equation:

input image signal value: Din density characteristic adjustment value: T table data value corresponding to the input image signal value Din: new[d], new[+1]

$$T = new[d] + \{(new[d+1] - new[d])/16 \times (Din\%16)\}$$

(A%B indicates a remainder when A is divided by B. In this example, A=Din, B=16, and d satisfies the relation of new[d]≦Din<new[d+1]).

However, the following equation is used only when d=15.

$$T = new[15] + \{(new[16] - new[15])/15 \times (Din\%15)\}$$

(A%B indicates a remainder when A is divided by B.)

For example, when the supplied input image signal Din is 25(h), 46(h) is calculated as the density characteristic adjustment value T based on the density characteristic adjustment value 40(h) corresponding to the input image signal value new[d]20(h) from the table 133 and the density characteristic adjustment value 57(h) corresponding to the input image signal value new[d+1]30(h).

Thus, a value derived by effecting the linear interpolation for each pixel of the input image signal on the real time basis in the circuit is treated as the density characteristic adjustment value T to adjust or correct the input image signal Din.

As a result, the density characteristic adjusting section 135 adjusts the density for an input image signal supplied from the image correcting section 105 of the scanner section 4 via the image signal bus 120 according to the density characteristic adjustment value supplied from the density characteristic adjustment value calculating section 134, and an output image signal whose density is adjusted is output to the page memory 98 or the laser driver 113 of the printer section 6 via the image data bus 120.

As described above, a density characteristic adjusting table corresponding to the set density is formed based on light, center and dark reference data for density characteristic adjustment previously stored, a density characteristic adjustment value corresponding to an input image signal from the scanner section is derived by effecting the linear interpolation according to the density characteristic adjustment values at two neighboring points based on the input image signal, the input image signal is corrected based on the thus derived density characteristic adjustment value in the density characteristic adjusting section and then the corrected image signal is output as an output image signal to the printer section.

As a result, the storage capacity of a memory for storing the tables used for density adjustment can be reduced and the density adjustment can be changed with a relatively high degree of freedom.

Figure 9:
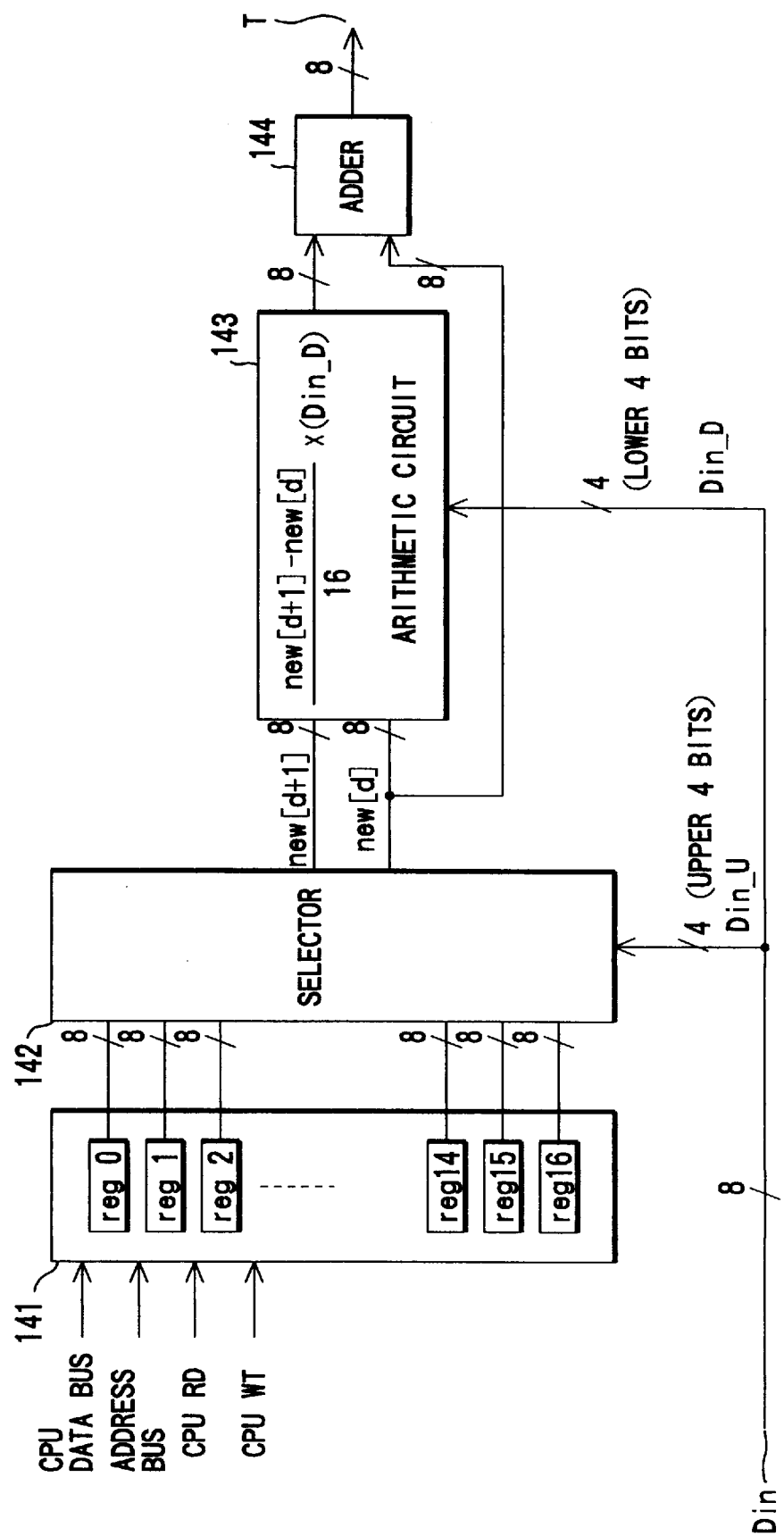
FIG. 9 is a block diagram showing on e concrete example of a computing circuit section for effecting the density characteristic adjustment by using computing values stored in the density characteristic adjusting table of FIG. 4.

FIG. 9 is a block diagram showing one example of a concrete circuit of the density characteristic adjusting table section 133, density characteristic adjustment value calculating section 134, and density characteristic adjusting section 135 shown in FIG. 4 and the construction and operation thereof are explained below.

In FIG. 9, a register circuit 141 is included in the density characteristic adjusting table section 133 and a total of 17 registers reg0, reg1, reg2, . . . , reg16 are provided in the register circuit 141. Also, terminals of the CPU data bus and address bus, read terminal RD, write terminal WT connected to the main CPU 91 are provided in the register circuit 141.

An 8-bit output from each of the registers reg0 to reg16 is supplied to a selector 142 and upper 4 bits Din_U of an 8-bit input image signal Din are supplied to a selection terminal of the selector 142.

As an output of the selector 142, new[d] and new[d+1] are derived, and new[d] and new[d+1] are obtained when register address data supplied to the selection terminal is Din_U, and new[d] is obtained when the register address data is Din_U. new[d] is data of a register address Din_U and new[d+1] is register address Din_U+1. The above data items are of 8 bits and supplied to an arithmetic circuit 143.

The arithmetic circuit 143 is supplied with lower 4 bits Din_D of the input image signal and performs a preset operation. The operation is given by the following expression.

$$(new[d+1] - new[d])/16 \times (Din\_D)$$

The above operation is to derive a value of the second term on the right-hand side of the above expression and an output image signal T is derived by adding the thus derived value to a value new[d] of the first term on the right-hand side in an adder 144.

Figure 10:
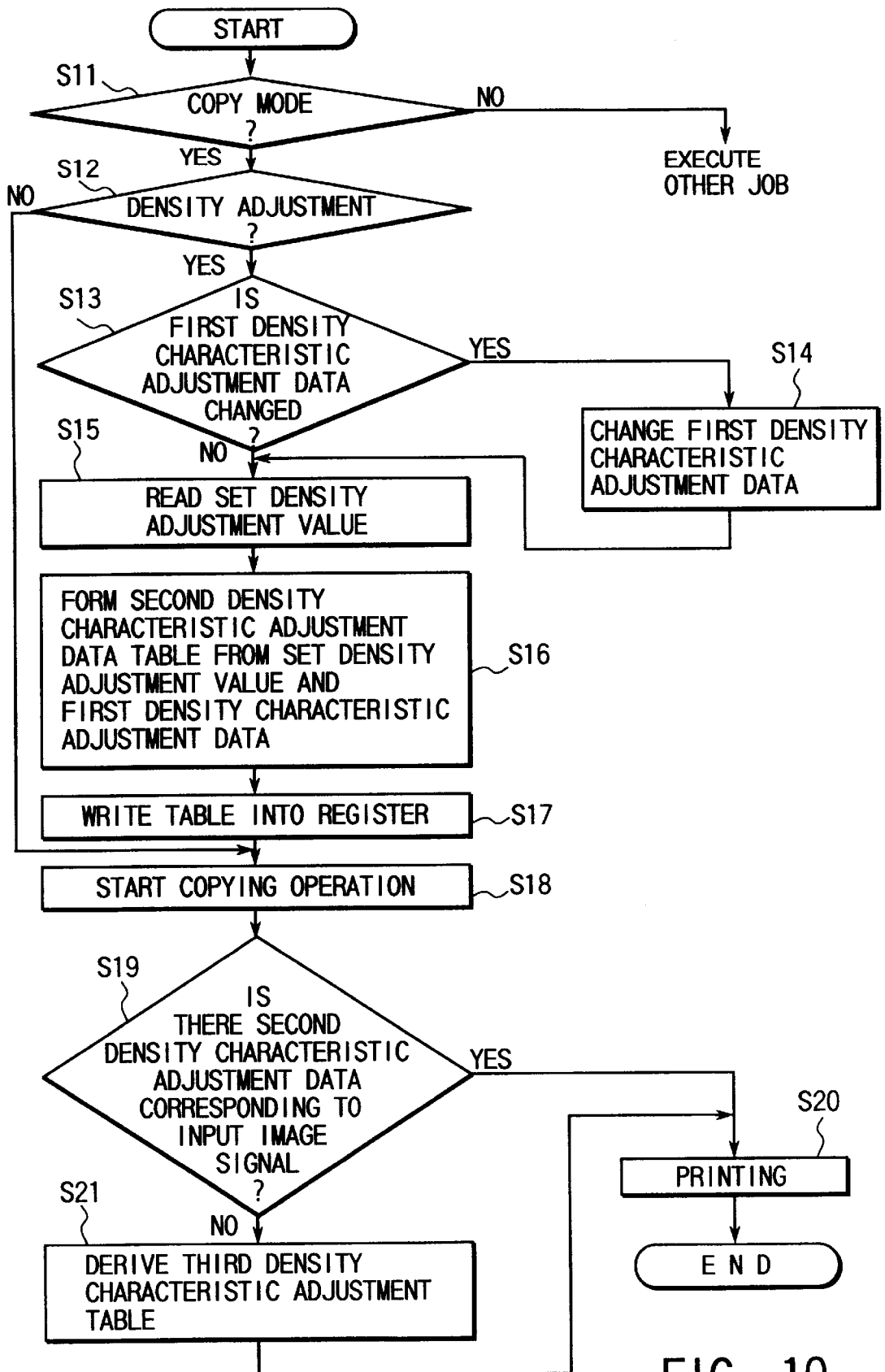
FIG. 10 is a flow chart for illustrating the whole operation of the embodiment of FIG. 1.

Next, the document copying operation of the image forming apparatus of this embodiment is explained with reference to FIG. 10.

First, assume that the power source switch is turned ON and it is detected in the step S11 that a preset copying mode is specified. In this state, the main CPU 91 checks in the step S12 whether or not the density adjusting operation has been effected on the operation panel 83.

If the result of the checking operation in the step S12 is "NO", the main CPU 91 directly effects the step S18 to start the copying operation.

If it is detected that the density adjusting operation is specified, whether the corresponding relation of the input image signal and the first density characteristic adjustment data are changed or not is checked in the step S13, and if the result is "YES", the step S14 is effected to change the corresponding relation of the first density characteristic adjustment data and the input image signal.

If the result in the step S13 is "NO", the step S15 is effected to read out the value of the set output image density, then, in the next step S16, a corresponding table is read out from the correction data table 130 and supplied to the table forming section 132 via the selector 131 and a density adjusting table indicating the value of the output image density in the specified copying mode is formed in the table forming section 132 and, in the step S17, the thus formed table is written into the register circuit 141 of the density characteristic adjustment table section 133.

In this state, the copying operation is started in the step S18.

First, whether the second density characteristic adjustment data written into the register circuit 141 coincides with the input image signal or not is checked, and if the result is "YES", the step S20 is effected to perform the printing operation and then the process is completed.

If the result in the step S19 is "NO", the step S21 is effected to derive a third density characteristic adjustment table by effecting the interpolation based on the upper and lower second density characteristic adjustment data items corresponding to an input image signal read by the scanner section 4 and then the printing operation is effected by use of the thus derived value in the step S20. That is, an input image signal Din is supplied for each pixel to the selector 142, and in the step S16, data obtained after the density adjustment and corresponding to the input pixel is derived by the arithmetic circuit 143 and adder 144.

The thus derived density characteristic adjustment value is supplied to the density characteristic adjusting section 135, the input image signal from the scanner section 4 is subjected to the preset density adjustment, a derived output image signal is supplied to the printer section 6, the printing operation is effected in the step S20 and the copying operation is completed.

In the above explanation, the density characteristic adjustment table is formed by effecting the linear interpolation by using the adjustment table containing data items of a number less than the number of data items of input multi-density data, but as the interpolation method, the Lagrange interpolation method, spline interpolation method, method of least square, Newton interpolation method, Neville interpolation method can be used in the same manner as described above instead of the linear interpolation method.

As described above, according to this invention, it is possible to provide an image forming apparatus in which the storage capacity of a memory used can be reduced since it is not necessary to previously provide data tables for density adjustment and necessary data can be obtained by an real-time operation and the range of adjustment can be set with a relatively high degree of freedom since data used as a reference for adjustment can be freely changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An image forming apparatus comprising:

generation means for generating an input image signal;

setting means for setting output density of an output image signal to be formed in accordance with the input image signal;

storage means for storing first density curve data representing a first relation between density of the input image signal and first density of the output image signal and second density curve data representing a second relation between the density of the input image signal and second density of the output image signal, the second density being higher than the first density;

creation means for creating third density curve data representing a third relation between the density of the input image signal and a third density of the output image signal, based on the first density curve data and the second density curve data in accordance with the output density set by said setting means;

conversion means for converting the input image signal generated by said generating means into the output image signal having a density determined by said third density curve data; and image forming means for forming an output image on an image recording medium based on the output image signal converted by said conversion means, wherein said storage means further stores a fourth density curve data representing an output image signal having a density lower than the density of the first image signal.

2. An image forming apparatus according to claim 1, wherein output density lower than a center reference is designated, and wherein fifth density curve data is generated according to the first and fourth density curve data.

3. An image forming apparatus according to claim 1, wherein said first, second and third density curve data are center reference data, dark reference data and light reference data, respectively.

4. An image forming apparatus according to claim 1, wherein said third density curve data is created using the first and second density curve data when density of an output image data higher than that of a center reference is designated.

5. An image forming apparatus according to claim 3, wherein said image forming apparatus has an ordinary image forming mode and an image adjustment mode, and contents of said first and second density curve data stored in said storage means are varied in said image adjustment mode.

6. An image forming apparatus according to claim 5, wherein one of a character mode, a photograph mode and a character/photograph mode is selected in said image adjustment mode.

7. A method of forming an image comprising the steps of:

generating an input image signal;

setting an output density of an output image signal to be formed in accordance with the input image signal;

storing first density curve data representing a first relation between a density of the input image signal and a first density of the output image signal and second density curve data representing a second relation between the density of the input image signal and a second density of the output image signal, the second density being higher than the first density;

creating third density curve data representing a third relation between the density of the input image signal and a third density of the output image signal, based on the first density curve data and the second density curve data in accordance with the output density set by said setting step;

converting the input image signal generated by said generating step into the output image signal having a density determined by said third density curve data; and forming an output image on an image recording medium based on the output image signal converted by said converting step, wherein said storing step further stores a fourth density curve data representing an output image signal having a density lower than the density of the first image signal.

8. A method for forming an image according to claim 7, further comprising the steps of:

designating output density lower than a center reference, and generating fifth density curve data according to the first and fourth density curve data.

* * * * *